US009826043B2

(12) United States Patent
Golasky et al.

(10) Patent No.: US 9,826,043 B2
(45) Date of Patent: Nov. 21, 2017

(54) METHOD TO PROTECT STORAGE SYSTEMS FROM DISCONTINUITY DUE TO DEVICE MISCONFIGURATION

(71) Applicant: Dell Products, LP, Round Rock, TX (US)

(72) Inventors: Richard K. Golasky, Round Rock, TX (US); Nam V. Nguyen, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 1204 days.

(21) Appl. No.: 13/911,239

(22) Filed: Jun. 6, 2013

(65) Prior Publication Data

US 2014/0365623 A1 Dec. 11, 2014

(51) Int. Cl.
*H04L 29/08* (2006.01)

(52) U.S. Cl.
CPC .......... *H04L 67/14* (2013.01); *H04L 67/1097* (2013.01)

(58) Field of Classification Search
CPC .......................... H04L 49/70; H04L 41/0893
USPC ........ 709/221, 222, 223, 224; 370/232, 252, 370/254
See application file for complete search history.

(56) References Cited

U.S. PATENT DOCUMENTS

| 7,136,923 | B2* | 11/2006 | Yamaguchi | G06F 11/3409 709/224 |
| 7,337,124 | B2* | 2/2008 | Corral | G06Q 10/06 705/7.17 |
| 7,411,915 | B1 | 8/2008 | Spain et al. | |
| 7,804,947 | B2 | 9/2010 | Brown et al. | |
| 8,175,001 | B2 | 5/2012 | Lubeck et al. | |
| 2005/0240609 | A1* | 10/2005 | Mizuno | H04L 67/1097 |
| 2006/0048218 | A1* | 3/2006 | Lingafelt | H04L 67/303 726/11 |

(Continued)

OTHER PUBLICATIONS

"Implementing the Software V7000 and the IBM System Storage SAN32B-E4 Encryption Switch"—Tate et al, IBM, Feb. 2012 http://www.redbooks.ibm.com/redbooks/pdfs/sg247977.pdf.*

(Continued)

*Primary Examiner* — Randy Scott
(74) *Attorney, Agent, or Firm* — Hamilton, Brook, Smith & Reynolds, P.C.

(57) ABSTRACT

The invention provides for a method and corresponding Information Handling System (IHS) to protect storage systems from device discontinuity caused by misconfigurations. An embodiment of the IHS comprises a network switch coupled for communication to a storage group where a member of the storage group is a group leader. The group leader has access to configuration information for each member of the group and the network switch. The IHS further comprises an agent monitor that communicates a proposed change affecting the switch and/or a member of the group to the group leader. The group leader in response to the proposed change determines the acceptability of the proposed change using the accessed configuration information and in turn, communicates the determined acceptability to the agent monitor at the network switch. The agent monitor or the group leader then provides output indicating the acceptability of the proposed change to a network administrator.

22 Claims, 6 Drawing Sheets

FIG. 1

(56) References Cited

U.S. PATENT DOCUMENTS

2010/0125855 A1* 5/2010 Ferwerda .............. G06F 9/5027
719/317
2014/0115138 A1* 4/2014 Biles .................... H04L 41/046
709/223

OTHER PUBLICATIONS

"Cisco Prime Network 3.8, Change and Configuration Management, User and Administrator Guide," revised May 3, 2012.

* cited by examiner

METHOD TO PROTECT STORAGE SYSTEMS FROM DISCONTINUITY DUE TO DEVICE MISCONFIGURATION

BACKGROUND OF THE INVENTION

The invention generally relates to network device management. There has been an increase in the use of networked devices, and complexity in network device management and system maintenance has followed. These difficulties lead to unintentional device downtime from errors caused by the mismanagement of the network devices.

Networks and network devices have also been the target of malicious attacks. Attacks, such as hacking and sabotage, may too cause device downtime.

SUMMARY OF THE INVENTION

Thus, an efficient method of device management that prevents device downtime is needed. The present invention is directed to a method and corresponding system to protect against device discontinuity caused by network and device misconfigurations.

A method for preventing device discontinuity begins by accessing configuration information of a group and a network switch that is communicatively coupled to the group. Next, the acceptability of a proposed change that affects a member of the group and/or the network switch is determined using the accessed configuration information. Finally, output is provided that indicates the acceptability of the proposed change.

According to an embodiment of the invention, the group is a multi-member group. In an example embodiment, the group is a group of target devices, a cluster of servers, a group of host side initiators, a storage array, or a group of storage arrays.

According to the principles of an embodiment of the invention, the output may be a notice that indicates the acceptability of the proposed change and the output may be provided in a manner that facilitates the acceptance or rejection of the proposed change by a user. In an alternative embodiment, the proposed change is communicated between the network switch by an agent monitor that is communicatively coupled to the group. In a further embodiment of the invention, a member of the group is a group leader. In yet another embodiment, the group leader, the agent monitor, or a combination thereof, determine the acceptability of the proposed change. Further still, according to an embodiment of the invention, the agent monitor provides the output indicating the acceptability of the proposed change.

In an embodiment of the method, the configuration information is stored on a database. In an alternative embodiment of the present invention, the configuration information is stored on a member of the group. Yet further still, the configuration information may be stored on a database communicatively coupled to the network switch and one or more group members.

According to an embodiment of the invention, the stored configuration information may comprise: a broadcast storm control parameter, a data center bridging parameter, a device name, an enhanced transmission selection (ETS) parameter, a group leader status, an internet protocol (IP) address, a link-level flow control 802.3x parameter, a maximum transmission unit (MTU) parameter, a media access controller (MAC) address, a port disablement, a port exclusion, a port number, a priority flow control (PFC) parameter, a spanning tree protocol parameter, a switch configuration parameter, a virtual local area network identification (vlanid), a vlanid membership, or any combination thereof. Similarly, the proposed change may be at least one of a broadcast storm control parameter change, a DCB parameter change, a device name change, an ETS parameter change, a group leader status change, an IP address change, a link-level flow control 802.3x parameter change, a MTU parameter change, a MAC address change, a port disablement change, a port exclusion change, a port number change, a PFC parameter change, a spanning tree protocol parameter change, a switch configuration parameter change, a vlanid change, a vlanid membership change, or any combination thereof.

Another embodiment of the invention is directed to an information handling system (IHS). The IHS comprises a network switch coupled for communication to a group, where a member of the group is a group leader. The group leader has access to configuration information for each member of the group and the network switch. The IHS further comprises an agent monitor which communicates between the network switch and the group leader, the agent monitor is configured to communicate a proposed change affecting the network switch and/or a member of the group to the group leader. The group leader, in response to the proposed change, determines the acceptability of the proposed change using the configuration information and communicates the determined acceptability to the agent monitor. Further, the agent monitor may provide an output indicating the acceptability of the proposed change.

In an alternative embodiment of the IHS, the group is a multi-member group. In yet another embodiment of the present invention, the IHS may be configured to dynamically allocate the group member to be the group leader. According to a further embodiment of the IHS, any member of the group may be the group leader. In yet another example embodiment, the group may be a group of target devices, a cluster of servers, a group of host side initiators, a storage array, or a group of storage arrays. A storage array may comprise a tape library or may be setup in a redundant array of independent disks (RAID) configuration and/or storage enclosures.

According to one or more embodiments of the IHS, the stored configuration information and the proposed change may be as described hereinabove in relation to embodiments of the method of the invention.

In an alternative embodiment of the IHS, the output may be a notice indicating the acceptability of the proposed change and the output may be provided in a manner facilitating the acceptance or rejection of the proposed change by a user. According to the principles of an embodiment of the invention, one of, or a combination of the agent monitor and the group leader determine the acceptability of the proposed change.

In yet another embodiment of the present invention, the IHS further comprises a database that is communicatively coupled to the network agent and the database is configured to store the configuration information. Further still, in an alternative embodiment of the present invention, a group member stores the configuration information.

An embodiment of the invention is directed to a non-transitory computer readable medium having stored thereon a sequence of instructions which, when loaded and executed by a processor coupled to an apparatus causes the apparatus to access configuration information of a group and a network switch communicatively coupled to the group, determine the acceptability of a proposed change affecting a member and/or members of the group and/or the network switch using the configuration information; and provide output indicating the acceptability of the proposed change.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

As described hereinabove, the task of network device management has become complex, which, oftentimes, leads to devices becoming inaccessible because of network configuration errors (misconfigurations). In a storage area network environment, for example, it is beneficial to have storage devices available twenty-four hours per day and 7 days per week so as to meet users' demand for device accessibility. When storage systems are unavailable due to an administrator unknowingly misconfiguring a device or the network, this creates downtime, loss of business productivity, and very often requires a lengthy process to determine the cause of the failure.

These problems may be further compounded in complex storage system topologies. A storage system can operate as a single physical storage unit, however, multiple individual storage units may be "combined" to operate as a single entity, i.e., a storage group, to provide greater storage capability. However, in the event of a misconfiguration of a single member of a storage group, the entire storage group may be unavailable, and thus all of the data on the members of the storage group is inaccessible.

Thus, embodiments of the invention are directed to methods and systems for preventing device discontinuity caused by errors in device and/or network configuration.

A description of example embodiments of the invention follows.

Figure 1:
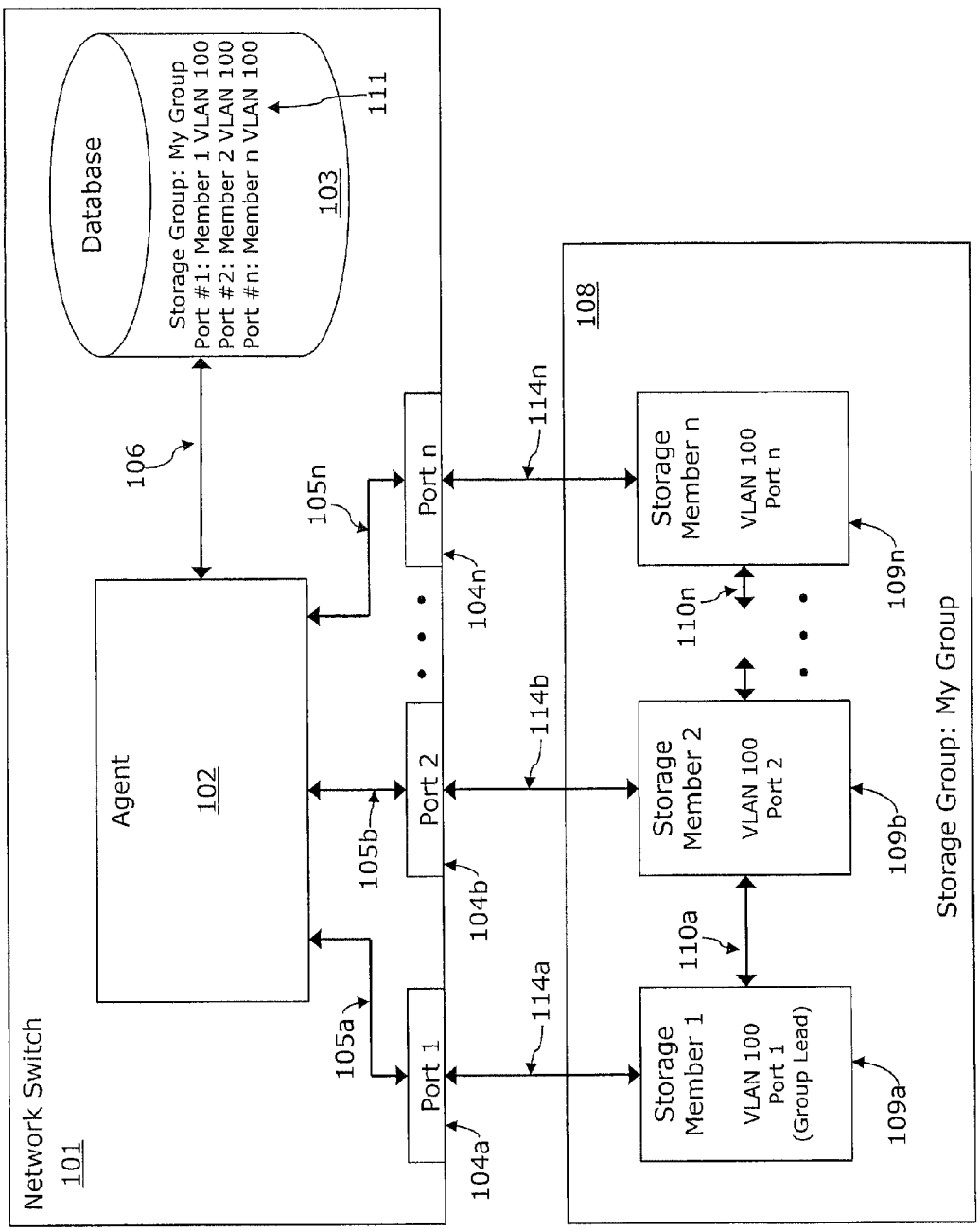
FIG. 1 is a simplified block diagram of an information handling system (IHS) according to principles of the present invention.

FIG. 1 is a simplified block diagram of an information handling system (IHS) 100 configured to prevent device discontinuity due to misconfigurations. The IHS 100 comprises a network switch 101 that is communicatively connected to a storage group 108. As is known in the art, users may access the storage group 108 via the network switch 101 to access and save data on the storage members 109*a-n* of the storage group 108. Further, a network administrator may configure the IHS 100 and its various components via the network switch 101.

The network switch 101 comprises an agent 102. The agent 102 facilitates communication between the components of the IHS 100. The network switch 101 further comprises the database 103. The database 103 is communicatively connected to the agent 102 via the interconnect 106. The database 103 is configured to store data in any manner as is known in the art. According to an embodiment of the invention, the database 103 stores data, such as the configuration information 111 relating to the storage group 108, the storage group's storage members 109*a-n*, and the network switch 101. While the database 103 is depicted as a component of the network switch 101 the database 103 may be located in any location, i.e., remotely located, as long as the database 103 is communicatively coupled to the network switch 101. Further, while depicted as a single database 103, the network switch 101 may use any combination of databases to store configuration information, such as the data 111. Further, data may be stored in a distributed manner across databases in several locations. The agent 102 further connects to the ports 104*a-n* via the interconnections 105*a-n*. The ports 104*a-n* each allows for data, such as configuration information 111 to be transferred between the agent 102 and the storage group 108.

The storage group 108 is a collection of storage members 109*a-n*. The storage group may comprise any number of storage members and embodiments of the present invention may comprise storage groups with a single member. The storage members 109*a-n* are coupled for communication to the network switch 101 via the interconnects 114*a-n* and the ports 104*a-n* respectively. In an embodiment of the invention, the storage members 109*a-n* are connected to one another via interconnects, such as the interconnect 110*a*.

According to the principles of the present invention, the IHS 100 may be configured to prevent discontinuity of the storage members 109*a-n* that is caused by misconfigurations of the storage group 108 and/or the network switch 101. According to an embodiment of invention, a storage member, such as the storage member 109*a*, acts as a group leader for the storage group 108. The group leader, storage member 109*a* in this instance, may operate so as to take ownership of the group 108 and may hold the virtual internet protocol (IP) address for the group 108. As the group leader, the storage member 109*a* has access to the configuration information of the group 108 and the network switch 101. The group leader 109*a* may have access to this information through a variety of different avenues. This information may be passed to the group leader 109*a* via the network switch 101 and stored locally by the group leader 109*a*. In such an embodiment, the network switch 101 may maintain a database, such as the database 103, to store configuration information, such as the information 111 about the storage group 108 and the network switch 101. In an alternative embodiment, configuration information may be stored on a storage device, such as a database, by the group leader 109*a*. The group leader 109*a* may maintain a database synchronized with the latest configuration information of the IHS 100. For example, if a setting for the storage member 109*b* is changed this change may be directly communicated to the group leader 109*a*. This communication may occur via the interconnect 110*a*. However, in an alternative embodiment of the invention, there may be no direct interconnection between the group members 109*a-n* and the changes to configuration information may be communicated between group members 109*a-n* via the network switch 101.

In another embodiment of the invention, the group leader's access to the information may be restricted. For example, the group leader may only have access to configuration information such as the information 111 when such information is necessary for the group leader to know. To illustrate, an embodiment of the invention contemplates distributed decision making, e.g., the group leader may determine the acceptability of a proposed change that affects the storage group and the agent may determine the acceptability of a proposed change that affects the network switch. In such an embodiment, access to the information may be restricted such that the respective components only have access to the information that is needed for their decision making.

The configuration information that is accessible by the group leader 109a, may include any such configuration information relating to the IHS 100 as is known in the art. Such configuration information may comprise, but is not limited to: a broadcast storm control parameter, a data center bridging (DCB) parameter, a device name, an enhanced transmission selection (ETS) parameter, a group leader status, an internet protocol (IP) address, a link-level flow control 802.3x parameter, a maximum transmission unit (MTU) parameter, a media access controller (MAC) address, a port disablement, a port exclusion, a port number, a priority flow control (PFC) parameter, a spanning tree protocol parameter, a switch configuration parameter, a virtual local area network identification (vlanid), and/or a vlanid membership.

While the embodiment depicted in FIG. 1 relates to the network settings and Internet Small Computer System Interface (iSCSI) domain, the present invention is not so limited. Rather embodiments of the present invention, as would be known to a person of ordinary skill in the art, may be directed to preventing device discontinuity in a variety of environments. In the various environments, configuration information and proposed changes would be those as known to persons of ordinary skill in the art. For example, an embodiment of the present invention may be directed to a Fibre Channel environment. In such an embodiment, configuration information may comprise any configuration information known in art, such as zone configuration settings.

The group lead 109a operates in conjunction with the agent monitor 102 to prevent device discontinuity. In this capacity, the agent monitor 102 communicates a proposed change between the network switch 101 via the interconnections 105a and 114a and the port 104a to the group lead 109a. The proposed change affects the group 108, the group's members 109a-n, and/or the network switch 101. In an embodiment of the invention, the proposed change is a configuration change ordered by a user of the IHS 100. For example in the network settings and iSCSI domain, the proposed change may comprise, but is not limited to a broadcast storm control parameter change, a DCB parameter change, a device name change, an ETS parameter change, a group leader status change, an IP address change, a link-level flow control 802.3x parameter change, a MTU parameter change, a MAC address change, a port disablement change, a port exclusion change, a port number change, a PFC parameter change, a spanning tree protocol parameter change, a switch configuration parameter change, a vlanid change and/or a vlanid membership change.

In response to the communicated proposed change, the group leader 109a determines the acceptability of the proposed change using the configuration information. In this role, the group leader 109a determines the effect the proposed change will have on the IHS 100, i.e., will the proposed change cause storage members 109a-n to be inaccessible or will it have some undesirable effect on the network switch 101. The proposed change may affect any component of the IHS 100 and/or the environment that comprises the IHS 100. Thus, an embodiment of the invention seeks to monitor any change occurring anywhere that may affect the IHS 100, and in turn determine the acceptability of this change.

After determining the acceptability of the proposed change, the group leader 109a communicates the determined acceptability to the agent 102. The agent 102 then provides output that indicates the determined acceptability of the proposed change. According to an embodiment of the invention, the output is a notice and/or warning indicating the acceptability of the proposed change. Further, the output may be provided in a manner to a user, such as a network administrator, such that the user may accept or reject the proposed change. In such an embodiment, the IHS 100 will either carryout or ignore the proposed change in response to the users selection. This ensures users maintain control over the IHS 100 as there will likely be instances where it is necessary to make a change that may lead to discontinuity of a device.

According to an alternative embodiment of the IHS 100, the acceptability of the proposed change may be determined by the agent 102 in combination with the group leader 109a. In such an embodiment, it may only be necessary for the group leader to have access to a subset of the configuration information. For example, in such an embodiment, a protocol may be developed where the group lead 109a determines the acceptability of changes affecting the storage members 109a-n, and the agent 102 determines the acceptability of changes affecting the network switch 101. In yet another embodiment, the agent 102 may alone determine the acceptability of proposed changes. In such an embodiment, there may be no need for the group 108 to have a group leader. Further, in an embodiment where only the agent 102 determines the acceptability of a proposed change, the IHS 100 may be configured such that only the agent 102 has access to the configuration information. In such an embodiment, the storage members 109a-n may communicate their respective configuration information to the agent 102, and the agent 102 may use this information to determine the acceptability of proposed changes.

In the IHS 100, configuration information 111 is depicted as stored on the database 103, however, according to an alternative embodiment, the configuration information 111 may be stored in a distributed manner. For example, the various components of the IHS 100 may each individually store configuration information. In such an embodiment, the various components of the IHS, the agent 102 and the storage members 109a-n may maintain synchronized storage of the configuration information. Further still, in another alternative embodiment, the various components of the IHS 100 may individually store their own respective configuration information and then such information may be communicated to the component of the IHS 100, such as the group lead 109a or the agent 102, when it is necessary for the component to determine the acceptability of a proposed change.

While only a single group member, the storage member 109a, is depicted as a group leader, in an alternative embodiment of the invention, any of the members 109a-n of the group 108 may be a group leader. In such an embodiment, the storage group 108 or its members 109a-n, alone or combination, may automatically determine the group leader. In another embodiment, the IHS 100 may be configured to dynamically allocate which member of the group is the group leader. The allocation may vary often and decisions regarding which member 109a-n that should be the group leader may be made according to any principles as are known in the art. For example, while data is being written to a storage member, it may be advantageous to have another member of the storage group operate as the group leader.

The group 108, depicted in FIG. 1, is a group of storage devices; however, the group may comprise any devices that are capable of being networked. For example, the group may be a group of target devices, a cluster of servers, a group of host side initiators, a storage array or a group of storage arrays. A storage array may comprise a tape library or may be configured in a redundant array of independent disks (RAID) configuration.

In an alternative embodiment of the invention, each storage member 109a-n may have their own respective agent to facilitate communication with the network switch 101 and the agent 102. Further, while illustrated as a multi-member group 108, an embodiment of the IHS 100 may be configured to operate with a single member group.

In yet another alternative embodiment, the IHS 100 and its various components may operate in a manner with fewer communications than described hereinabove. For example, after determining the acceptability of a proposed change, the group lead 109a may only communicate the determined acceptability of the proposed change to the agent 102 if the proposed change negatively affects the IHS 100. Similarly, the agent 102 may only provide output indicating the acceptability of a proposed change, when the proposed change negatively affects the IHS 100. Further, in an embodiment of the IHS 100 where the agent 102 determines the acceptability of a proposed change, the agent 102 may not communicate proposed changes to the group lead 109a. Similarly, in an embodiment where the agent 102 in combination with the group lead 109a determines the acceptability of a proposed change, the agent 102 may only communicate proposed changes to the group lead where necessary. For example, a proposed change may not be communicated to the group lead 109a when the proposed change affects a component of the IHS 100 that is the network switch's (101) responsibility.

Hereinabove, the storage group 108 has been described as comprising a single group lead 109a, however, according to an alternative embodiment of the invention, the storage group 108 may have one or more group leads. In such an embodiment, the storage member 109a-n that is the group lead may vary. Further, in another example, embodiment every storage member 109a-n may be configured to function as a group leader. Each group leader may in turn determine the acceptability of a proposed change and each determined acceptability may be communicated in the output. Alternatively, a protocol may be used to determine what group leader's or combination of group leaders' determination(s) to output.

Figure 2:
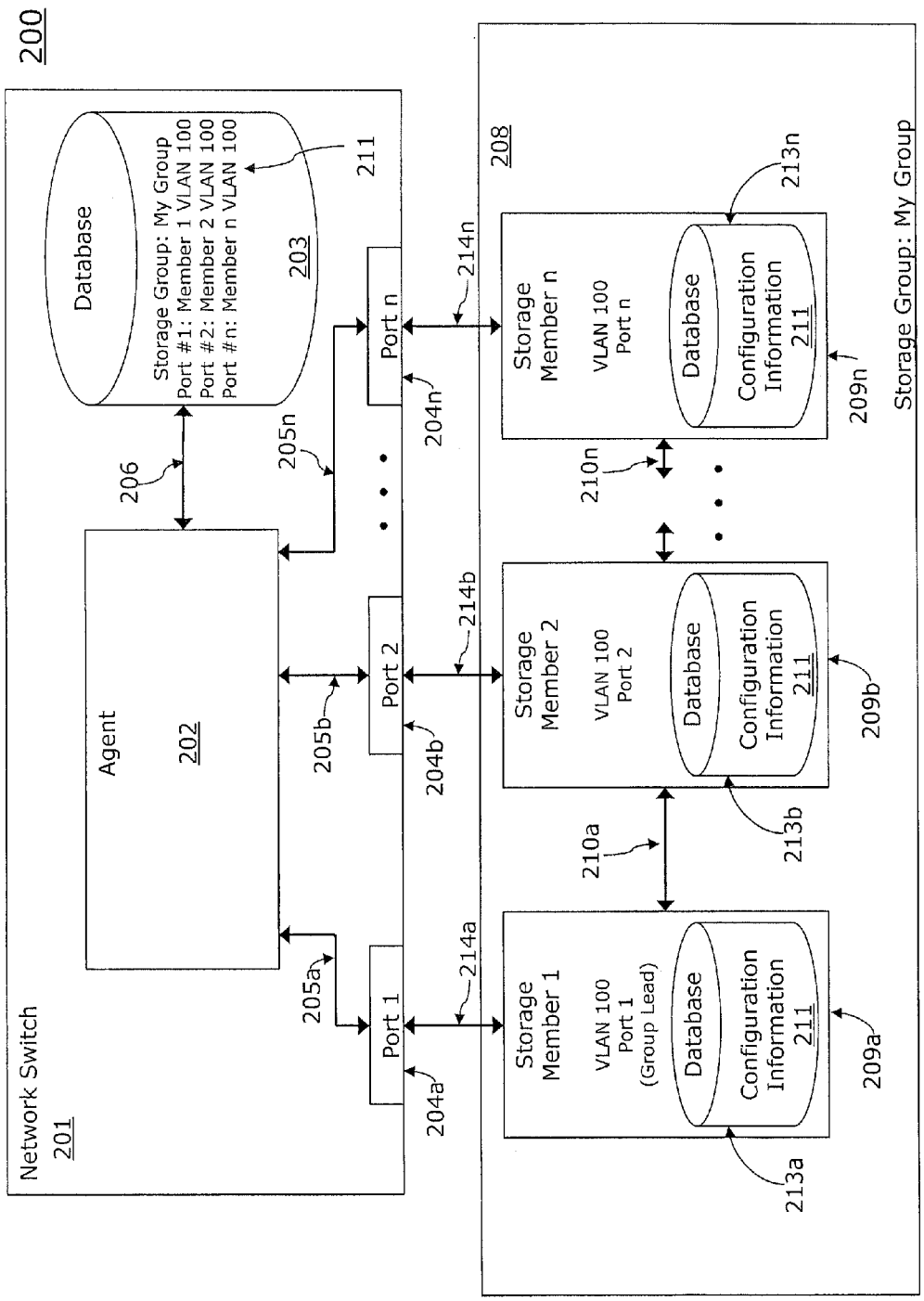
FIG. 2 is a block diagram of an alternative embodiment of an IHS according to principles of the invention.

FIG. 2 depicts an IHS 200 according to an alternative embodiment of the invention. The IHS 200 and its various components may be configured to operate in a manner as described hereinabove in relation to FIG. 1. However, each storage member 209a-n of the IHS 200 has a respective database 213a-n coupled thereto. Further, in an alternative embodiment of the IHS 200, the respective storage members 209a-n may be communicatively coupled to a shared database or array of databases, such that each storage member 209a-n may have access to the data stored thereon.

An embodiment of the IHS 200 is configured to provide for group lead failover. An example operation of the IHS 200 is described hereinbelow. Under "normal" operation the IHS 200 may operate according to the principles of the IHS 100 described hereinabove. For example, the group lead 209a is communicatively coupled to the network switch 201 via the interconnect 214a and the port 204a, and via the port 204a and the interconnect 205a the group lead 209a is coupled to the agent monitor 202. Under these normal conditions, the group leader 209a may access the configuration information for the IHS 200. For example, the group lead 209a may access the database 203, and/or the network switch 201 may communicate configuration information to the group leader 209a via the agent 202. Further, the other storage members, 209b-n, may communicate their respective configuration information to the group leader 209a via the interconnections 210a-n or such information may be communicated to the group leader 209a via the agent 202. In such an embodiment there may be no direct interconnections, such as the interconnections 210a-n, between the storage members 209a-n.

According to operation of an example embodiment of the IHS 200 under "normal" conditions, a proposed change is ordered by a user of the network switch 201. This proposed change is communicated by the agent 202 to the group lead 209a via the interconnections 205a and 214a and the port 204a. The group lead 209a then determines the acceptability of the proposed change using the configuration information 211 that is stored on the database 213a. After determining the acceptability of the proposed change, the group leader 209a communicates the determined acceptability to the agent 202 again via the interconnections 205a and 214a and the port 204a. The agent 202 then provides an output indicating the acceptability of the proposed change to the user. In this way, the acceptability of any change that affects the IHS 200 and its various components is presented to the user.

The IHS 200 is configured to operate in adverse conditions as well, for example, where the group member 209a is no longer able to function as a group leader, but the storage group 208 is still operational. When this occurs, a protocol will be followed such that another member 209b-n of the storage group takes over as the group leader. This switch over may occur as result of a command from the agent 202. Further, according to another example embodiment, the members 209a-n of the storage group 208 may be configured to follow a protocol for determining which member 209a-n should be operating as group leader at a given time. Once another member 209b-n of the storage group 208 takes over as group leader this new group leader operates in accordance with the description of the group leader 209a described hereinabove.

Figure 3:
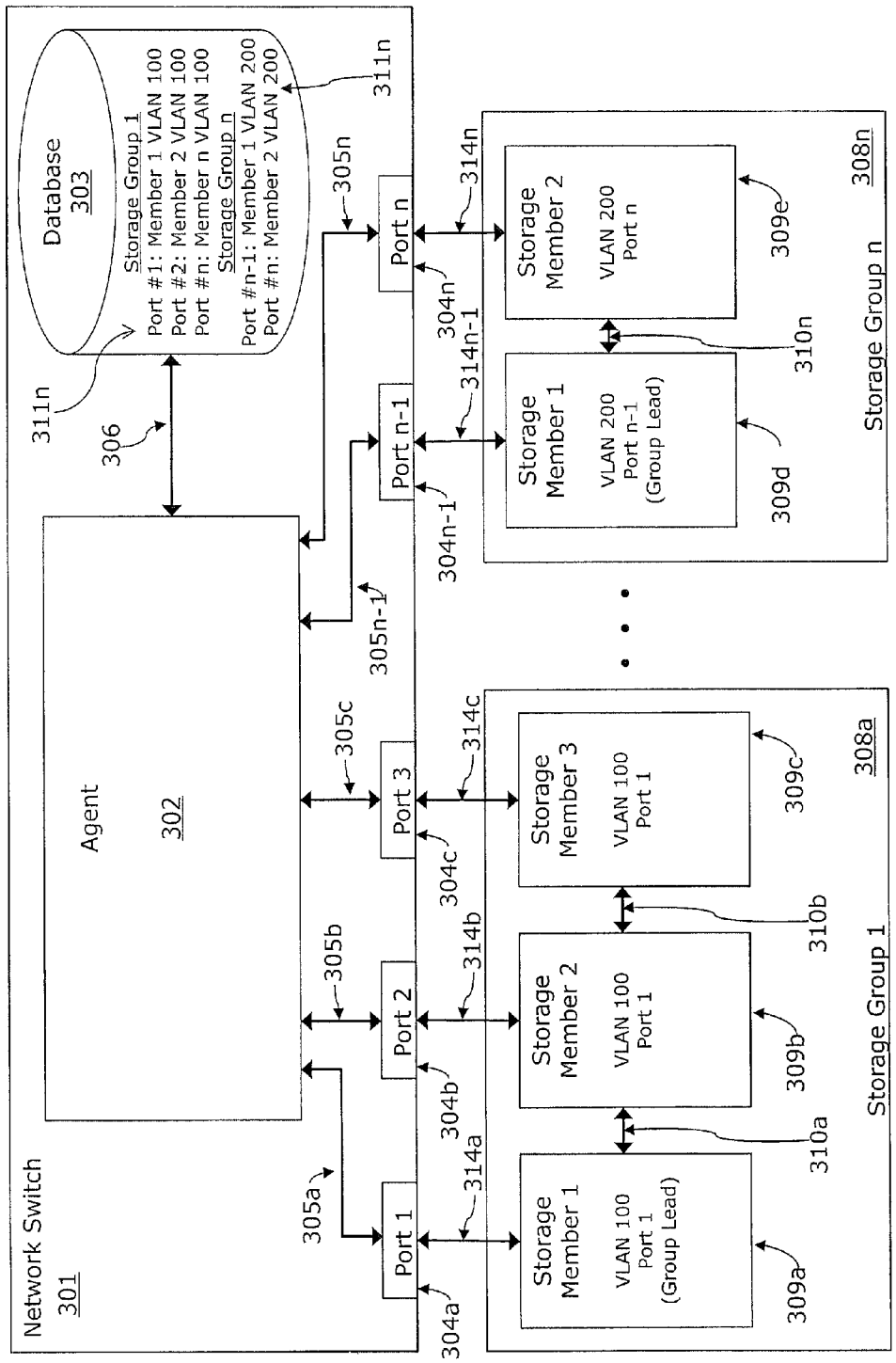
FIG. 3 is a simplified block diagram an IHS comprising multiple groups.

FIG. 3 is a simplified block diagram of an IHS 300 comprising multiple storage groups, 308a-n. The IHS 300 and its various components may be configured to operate in accordance with any of the multiple embodiments described herein. Specifically, the respective storage groups 308a-n may be configured to operate in a manner similar to the groups 108 and/or 208 described hereinabove in relation to FIGS. 1 and 2. While two groups are depicted, the groups 308a and 308n, the IHS 300 may comprise any number of storage groups, and the respective storage groups 308a and 308n may in turn comprise any number of storage members. The agent 302 is configured in a manner similar to the agents 102 and 202 described hereinabove, with the variation that the agent 302 is configured to handle the multiple storage groups 308a and 308n. The agent 302 may simply be configured to treat each group individually and function in a manner similar to the agents 102 and 202 as described hereinabove. Further, the agent 302 may store the respective configuration information 311a and 311n for the respective storage groups 308a and 308n in the database 303. In an embodiment of the IHS 300, a respective storage group, such as the storage group 308a, may function in a back-up role for another storage group, such as the storage group 308n. In such an embodiment, the group leader of the storage group serving as back-up, would have access to the configuration information for the storage group that it is backing up. In this manner, a group leader for another group may serve the function of group leader for another storage group in the event of a failure.

Figure 4:
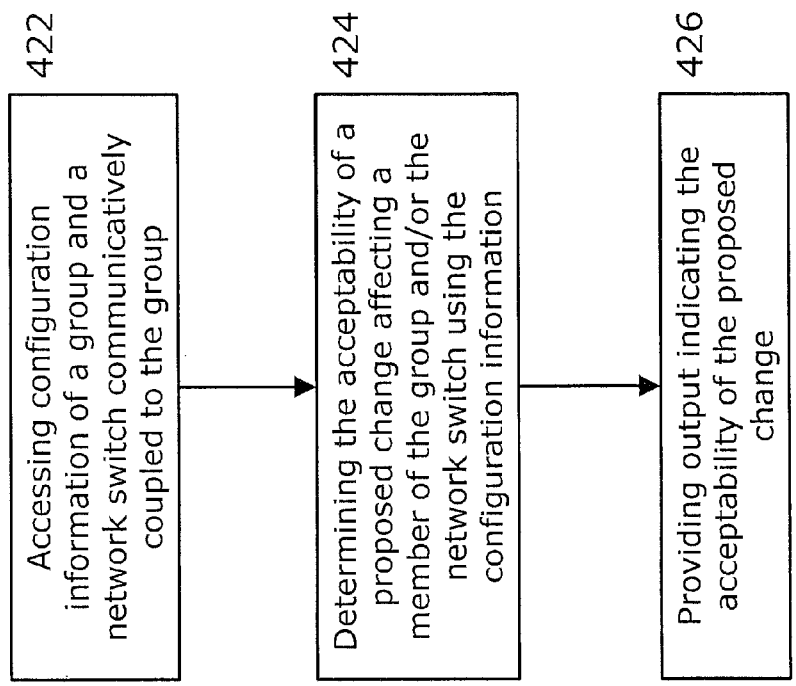
FIG. 4 is a flow chart of a method of preventing device discontinuity due to misconfiguration.

FIG. 4 is a flow diagram of a method 420 of preventing device discontinuity caused by misconfiguration. The method 420 begins by accessing configuration information that pertains to a group and a network switch that is communicatively coupled to the group (422). Next, using the accessed configuration information, the acceptability of a proposed change that affects a member of the group and/or the network switch is determined (424). Finally, the method concludes by providing output that indicates the acceptability of the proposed change (426).

The method 420 begins with accessing configuration information about a group and a network switch that is coupled for communication to the group (422). This accessing may be by a group leader of the group as described hereinabove in relation to FIGS. 1-3. Further this configuration information may be accessed from a database and/or group members. Yet further still, this information may be accessed from storage local to a device, for example, a group leader accessing information on a database at the group leader. Accessing information may further comprise a communication between a group leader and an agent communicatively coupled to the group leader as described herein in relation to FIGS. 1-3. Yet further still, the configuration information may be accessed via communication between an agent at the group leader and an agent at the network switch, the switch being communicatively coupled to the group leader.

As presented hereinabove, after accessing the configuration information (422), the next step of the method 420, is to determine the acceptability of a proposed change that affects a member of the group or the network switch (424). The proposed change is any change that may affect the switch, the group, the group members, and/or an environment comprising the switch, the group, and/or the group members. The changes may be those as described hereinabove in relation to FIG. 1. As described herein, the acceptability may be determined by a network switch agent, a group agent, a group member, some device, such as a computer running software particularly programmed that is coupled for communication to the network switch and/or group lead or some combination thereof. Further, according to an embodiment of the method 420, the proposed change may be communicated between a network switch and a group leader by an agent monitor prior to determining the acceptability of the proposed change. According to another example embodiment, the proposed change may be communicated to a group leader of the group. In yet another example embodiment, the determined acceptability may be communicated from a group leader to an agent at the network switch.

After the acceptability of the proposed change is determined (424), output is provided that indicates the acceptability of the proposed change (426). This output may take any form as is known in the art. For example, according to an embodiment of the invention the output is a notice displayed to a network administrator. In yet another embodiment of the invention, the output may be provided in a manner that allows a user to accept or reject the proposed change. In a further embodiment of the present invention, the output may be provided by an agent monitor communicatively coupled to the network switch.

Figure 5:
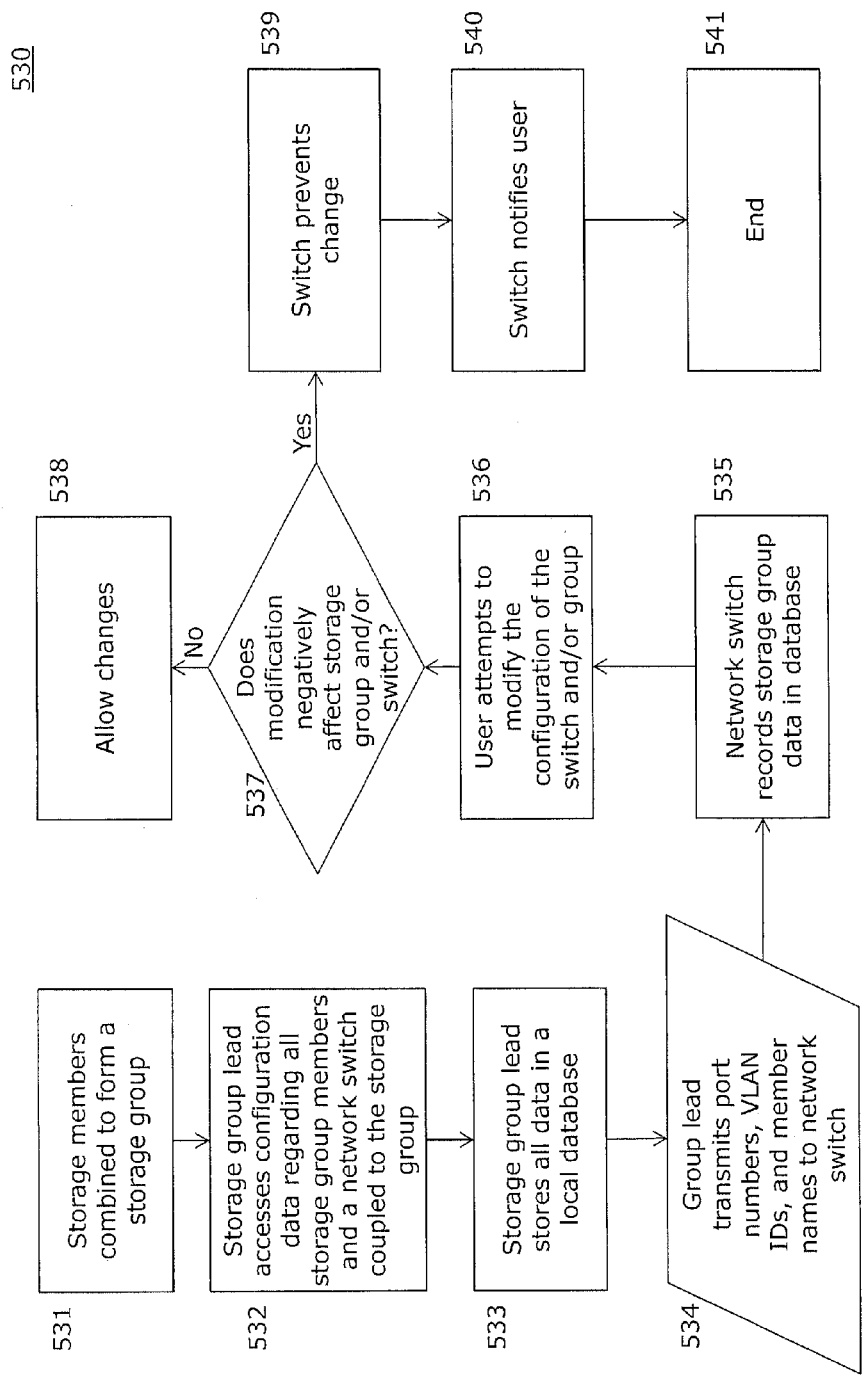
FIG. 5 is a flow chart depicting a method of preventing device discontinuity due to misconfiguration according to principles of the present invention.

FIG. 5 is a flowchart of a method 530 of practicing an embodiment of the present invention. To begin, storage members are combined to form a storage group (531). Next, the storage group lead obtains configuration data regarding all storage group members and a network switch coupled to the storage group (532). The storage group lead, in turn, stores this data in a database local to the storage group lead (533). After storing the data locally (533), the group lead transmits configuration information related to the group members to the network switch (534). Such information may comprise, port numbers, VLAN Ids and member names. The network switch then stores this received data in a database (535). This database may be local to the network switch or may alternatively be located remotely. Further, the data may be distributed amongst several databases. Steps 531 through 535 of the method 530 provide for what may be considered system setup. In these steps, the group lead obtains and stores configuration information, (532) and (533), and then this information is also backed-up via storage on the network switch side (534) and (535).

After these setup steps (531-535), a user attempts to modify the configuration of the switch and/or the storage group (536). Next, it is determined if the modification negatively affects the storage group and/or switch (537). If the change does not negatively affect the storage group, the proposed change is allowed (538). However, if the proposed change negatively affects the storage group, the switch prevents the change (539). When the switch prevents the change (539), the user is notified (540) and the method 530 ends (541). According to an alternative embodiment of the method 530, after the user is notified of the prevented change (540), the user may be presented with an option to override prevention and allow the change. The method 530 may be repeated for every proposed change or a subset of steps may be performed, i.e. starting at (536), for another proposed change. In another embodiment, after a proposed change is allowed (538), the change is carried out and steps (532)-(535) are repeated so that the configuration information at the group lead and the network switch are updated to reflect the change.

Figure 6:
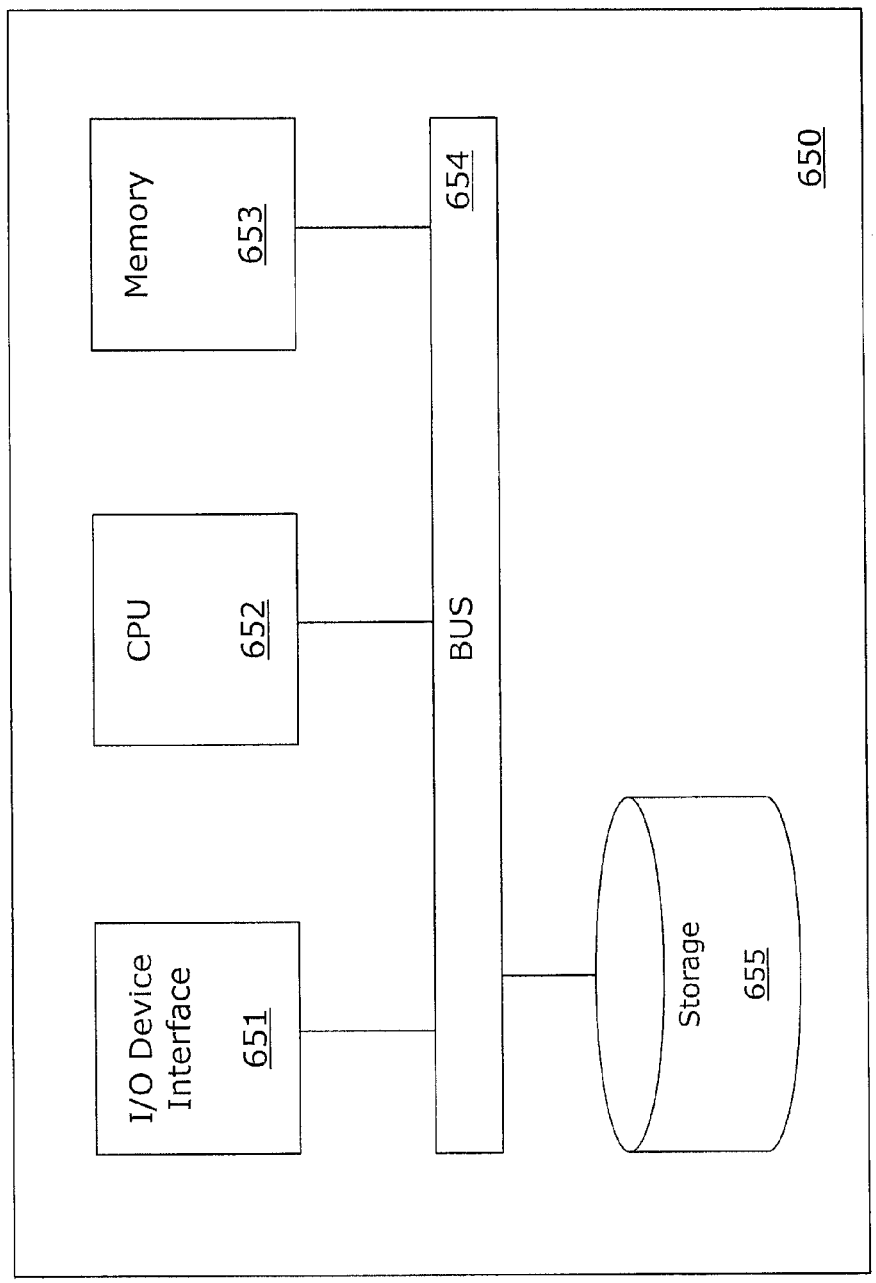
FIG. 6 is a simplified diagram of a computer system in which an embodiment of the present invention may be embodied.

FIG. 6 is a high level block diagram of a computer system 650 in which embodiments of the present invention may be embodied. The system 650 contains a bus 654. The bus 654 is a connection between the various components of the system 650. Connected to the bus 654 is an input/output device interface 651 for connecting various input and output devices, such as a keyboard, mouse, display, speakers, etc. to the system 650. A central processing unit 652 is connected to the bus 654 and provides for the execution of computer instructions. Memory 653 provides volatile storage for data used for carrying out computer instructions. Storage 655 provides non-volatile storage for software instructions, such as an operating system.

It should be understood that the example embodiments described above may be implemented in many different ways. In some instances, the various methods and machines described herein may each be implemented by a physical, virtual, or hybrid general purpose computer. A general purpose computer may be transformed into the machines that execute the methods described above, for example, by loading software instructions into memory or non-volatile storage for execution by a central processing unit.

Embodiments or aspects thereof may be implemented in the form of hardware, firmware, or software, or any combination thereof. If implemented in software the software may be stored on any non-transient computer readable medium that is configured to enable a processor to load the software or subsets of instructions thereof. The processor then executes the instruction and is configured to operate or cause an apparatus to operate in a manner as described herein.

While this invention has been particularly shown and described with references to example embodiments thereof, it will be understood by those skilled in the art that various changes in form and details may be made therein without departing from the scope of the invention encompassed by the appended claims.

What is claimed is:

1. An information handling system (IHS) comprising:
   a network switch communicatively coupled to a group of network elements, a member of the group being a group leader, the group leader having access to configuration information of each member of the group and the network switch;
   an agent monitor communicating between the network switch and the group leader, the agent monitor communicating to the group leader a proposed change affecting at least one of the network switch and a member of the group;
   the group leader in response to the proposed change determining acceptability of the proposed change using the configuration information and communicating the determined acceptability to the agent monitor; and
   the agent monitor providing output indicating the acceptability of the proposed change.

2. The IHS of claim 1 wherein the group is a multi-member group.

3. The IHS of claim 2 configured to dynamically allocate the group member to be the group leader.

4. The IHS of claim 1 wherein the configuration information comprises at least one of:
   a broadcast storm control parameter;
   a data center bridging (DCB) parameter;
   a device name;
   an enhanced transmission selection (ETS) parameter;
   a group leader status;
   an internet protocol (IP) address;
   a link-level flow control 802.3x parameter;
   a maximum transmission unit (MTU) parameter;
   a media access controller (MAC) address;
   a port disablement;
   a port exclusion;
   a port number;
   a priority flow control (PFC) parameter;
   a spanning tree protocol parameter;
   a switch configuration parameter;
   a virtual local area network identification (vlanid); or
   a vlanid membership.

5. The IHS of claim 1 wherein the group is:
   a group of target devices;
   a cluster of servers;
   a group of host side initiators;
   a storage array; or
   a group of storage arrays.

6. The IHS of claim 1 wherein the proposed change is at least one of:
   a broadcast storm control parameter change;
   a DCB parameter change;
   a device name change;
   an ETS parameter change;
   a group leader status change;
   an IP address change;
   a link-level flow control 802.3x parameter change;
   a MTU parameter change;
   a MAC address change;
   a port disablement change;
   a port exclusion change;
   a port number change;
   a PFC parameter change;
   a spanning tree protocol parameter change;
   a switch configuration parameter change;
   a vlanid change; or
   a vlanid membership change.

7. The IHS of claim 1 wherein the output is a notice indicating the acceptability of the proposed changed and the output is provided in a manner facilitating the acceptance or rejection of the proposed change by a user.

8. The IHS of claim 1 wherein one of, or a combination of the agent monitor and the group leader determine the acceptability of the proposed change.

9. The IHS of claim 1 further comprising:
   a database communicatively coupled to the network agent, the database storing the configuration information.

10. The IHS of claim 1 wherein a group member stores the configuration information.

11. The IHS of claim 1 wherein any member of the group may be the group leader.

12. A method comprising:
    accessing configuration information of a group of network elements and a network switch communicatively coupled to the group, wherein a member of the group is a group leader, the group leader having access to configuration information of each member of the group and the network switch;
    by an agent monitor communicating between the network switch and the group leader, communicating a proposed change affecting at least one of the network switch and a member of the group;
    determining acceptability of the proposed change using the configuration information; and
    providing output indicating the acceptability of the proposed change.

13. The method of claim 12 wherein the group is a multi-member group.

14. The method of claim 12 wherein the configuration information comprises at least one of:
    a broadcast storm control parameter;
    a data center bridging (DCB) parameter;
    a device name;
    an enhanced transmission selection (ETS) parameter;
    a group leader status;
    an internet protocol (IP) address;
    a link-level flow control 802.3x parameter;
    a maximum transmission unit (MTU) parameter;
    a media access controller (MAC) address;
    a port disablement;
    a port exclusion;
    a port number;
    a priority flow control (PFC) parameter;
    a spanning tree protocol parameter;
    a switch configuration parameter;
    a virtual local area network identification (vlanid); or
    a vlanid membership.

15. The method of claim 12 wherein the group is:
a group of target devices;
a cluster of servers;
a group of host side initiators;
a storage array; or
a group of storage arrays.

16. The method of claim 12 wherein the proposed change is at least one of:
a broadcast storm control parameter change;
a DCB parameter change;
a device name change;
an ETS parameter change;
a group leader status change;
an IP address change;
a link-level flow control 802.3x parameter change;
a MTU parameter change;
a MAC address change;
a port disablement change;
a port exclusion change;
a port number change;
a PFC parameter change;
a spanning tree protocol parameter change;
a switch configuration parameter change;
a vlanid change; or
a vlanid membership change.

17. The method of claim 12 wherein the output is a notice indicating the acceptability of the proposed change and the output is provided in a manner facilitating the acceptance or rejection of the proposed change by a user.

18. The method of claim 12 wherein one of, or a combination of the agent monitor and the group leader determine the acceptability of the proposed change.

19. The method of claim 12 wherein the agent monitor provides the output indicating the acceptability of the proposed change.

20. The method of claim 12 wherein the configuration information is stored on a database.

21. The method of claim 12 wherein the configuration information is stored on a member of the group.

22. A non-transitory computer readable medium having stored thereon a sequence of instructions which, when loaded and executed by a processor, causes:
accessing configuration information of a group of network elements and a network switch communicatively coupled to the group, wherein a member of the group is a group leader, the group leader having access to configuration information of each member of the group and the network switch;
by an agent monitor communicating between the network switch and the group leader, communicating a proposed change affecting at least one of the network switch and a member of the group;
determining acceptability of the proposed change using the configuration information; and
providing output indicating the acceptability of the proposed change.

* * * * *